United States Patent [19]

Gay et al.

[11] Patent Number: 4,923,044

[45] Date of Patent: May 8, 1990

[54] CLUTCH CONTROL DEVICE, ESPECIALLY FOR AUTOMOTIVE VEHICLES

[75] Inventors: Christian Gay, Amiens; Philippe Lassiaz, Levallois, both of France

[73] Assignee: Valeo, Paris, France

[21] Appl. No.: 408,187

[22] Filed: Sep. 15, 1989

[30] Foreign Application Priority Data

Sep. 23, 1988 [FR] France ................ 88 12437

[51] Int. Cl.⁵ ............................................. F16D 23/12
[52] U.S. Cl. ..................................... 192/98; 192/110 B
[58] Field of Search .............................. 192/98, 110 B

[56] References Cited

U.S. PATENT DOCUMENTS

| | | | |
|---|---|---|---|
| 3,900,091 | 8/1975 | Maucher | 192/98 |
| 4,144,957 | 3/1979 | de Gennes | 192/98 |
| 4,362,229 | 12/1982 | Villata | 192/98 |
| 4,529,075 | 7/1985 | Renaud | 192/98 |
| 4,565,271 | 1/1986 | Lassiaz | 192/98 |
| 4,667,797 | 5/1987 | Ball | 192/110 B |
| 4,697,681 | 10/1987 | Gay et al. | 192/98 |

FOREIGN PATENT DOCUMENTS

| | | | |
|---|---|---|---|
| 3113463 | 12/1982 | Fed. Rep. of Germany | 192/98 |
| 2337281 | 7/1977 | France | |
| 2533281 | 3/1984 | France | |
| 2533846 | 4/1985 | France | |

Primary Examiner—Rodney H. Bonck
Assistant Examiner—Nicholas Whitelaw
Attorney, Agent, or Firm—Charles E. Brown; Charles A. Brown

[57] ABSTRACT

A clutch control device, particularly for automotive vehicles, comprises a manoeuvring member which is coupled axially with a working element which engages the relevant part of the actuating member of the clutch itself. The manoeuvring member and working element are coupled together through a retaining shroud, using an assembly device which comprise a plurality of tabs or lugs projecting from a lateral wall of the retaining shroud and which are able to slide in corresponding axial grooves formed in the manoeuvring member until they leave the grooves on the face of the manoeuvring member opposite to that at which they were introduced. Relative rotation is then carried out between the retaining shroud and the manoeuvring member, so as to engage the tabs securely in radial recesses formed in the radial portion of the manoeuvring member, the recesses being offset by a predetermined angle from the axial grooves.

6 Claims, 3 Drawing Sheets

CLUTCH CONTROL DEVICE, ESPECIALLY FOR AUTOMOTIVE VEHICLES

FIELD OF THE INVENTION

The present invention relates generally to clutch control devices, especially for automotive vehicles, such devices being of the kind comprising, firstly, a working element by which the device is adapted to act on the clutch actuating means of a clutch, and secondly, a manoeuvring member by which the device is adapted to be displaced by means of a control member, the manoeuvring member being coupled axially with the said working element through a retaining shroud, the device further including assembly means for coupling the retaining shroud and the manoeuvring member together and comprising an axially acting resilient member.

BACKGROUND OF THE INVENTION

A clutch control device of the kind defined above is described in U.S. Pat. No. 4,529,075. In that arrangement, the manoeuvring member is provided with a transverse radial portion, while the retaining shroud is rigid and includes an annular lateral wall defining a shoulder on which the working element bears, with the said resilient member being axially confined together with a portion of the working element, between the said radial portion and the said shoulder. The resilient member bears on the working element and on the radial portion, in such a way that the working element is resiliently trapped between the radial portion and the shoulder. The assembly means, mentioned above, allow the working element to be assembled with the manoeuvring member, and comprise a plurality of lugs or tabs, resiliently deformable radially and forming part of the manoeuvring member, these tabs being hooked on to notches formed in the retaining shroud, and being maintained in engagement with these notches by the action of the said resilient member.

In service, and especially having regard to the effect of vibrations of the vehicle and shock forces, the lugs or tabs, being resilient, can sometimes escape from the notches formed in the retaining shroud, thus causing the assembly to disintegrate.

In addition, in certain cases it is necessary to make the lugs or tabs thinner, so that they are sufficiently flexible to enable them to be snapped into place during assembly. This however complicates the manufacture of the manoeuvring member. Furthermore, such an arrangement is not universally applicable, since it is somewhat difficult to apply in practice when the manoeuvring member has a transverse radial portion having no lateral wall or the like at its outer periphery. Finally, certain of the arrangements described in the above mentioned United States patent specification cause weakening of the retaining shroud.

SUMMARY OF THE INVENTION

An object of the present invention is to provide a novel assembly means between the retaining shroud and the manoeuvring member, such as to avoid the above mentioned disadvantages in a simple and economical manner, while allowing the various parts of the assembly to be effectively locked together without unduly weakening the retaining shroud, while at the same time obtaining further advantages.

A further object of the invention, in greater detail, is to provide a clutch control device of the kind defined above, in which the assembly means comprises a plurality of tabs extending from the lateral wall of the retaining shroud and projecting towards the interior of the said wall, characterised in that the manoeuvring member is provided with axially extending groove means interrupting its said radial portion so as to receive the said tabs, and further characterised in that the said radial portion has a plurality of recesses formed on one of its faces for cooperation of each said recess with an associated one of the said tabs, each of the said recesses being open radially at the outer periphery of the radial portion and being circumferentially offset with respect to the associated one of the said groove means, in such a way that assembly of the retaining shroud with the manoeuvring member can be effected by introducing the tabs into the axial groove means until they leave the latter at the appropriate face of the radial portion of the manoeuvring member, after which they can be brought into engagement in the respective said recesses by simple rotation, the resilient member being compressed during this assembly process.

The invention avoids undue weakening of the retaining shroud, and the engagement according to the invention is universally applicable, the hollow recesses being easily obtainable by moulding, or by stamping, according to the particular form of construction adopted for the radial portion of the manoeuvring member.

It will also be appreciated that the radial portion of the manoeuvring member is itself also not unduly weakened.

It would of course have been possible to consider using an arrangement of the kind shown in FIGS. 15 and 16 of U.S. Pat. No. 4,144,957, but the arrangement would not have been satisfactory since it would necessitate forming openings of large circumferential length, so reducing the mechanical strength of the retaining shroud. In addition, an interference could take place between the lugs, which would therefore in practice have to be so shaped and dimensioned as to make a good fit with the retaining shroud, and the control member. This arrangement is difficult to apply in practice when the control member is in the form of an annular piston. The arrangement according to the invention does not have these disadvantages. The control member may be of any desired type, and the manoeuvring member may be provided with a radial portion which may or may not have an axial flange at its outer periphery.

It will be appreciated that the axial distance between the tabs and the shoulder of the retaining shroud may be quite large, in order to assist accurate definition of the force exerted by the resilient member on the working element.

According to a preferred feature of the invention, the tabs or lugs are in the form of radial lugs. This enables good contact to be obtained between the lugs and the associated hollow recesses in which they are lodged, so assisting secure maintenance of the assembly means in position when the device is in use.

Preferably, when the retaining shroud has a flange portion for direct engagement with the control member, the radial tabs or lugs are formed as extensions of this flange portion.

The features and advantages of the invention will appear more clearly from the description which follows, and which is given by way of example only and with reference to the accompanying diagrammatic drawings.

DESCRIPTION OF PREFERRED EMBODIMENTS OF THE INVENTION

Figure 1:
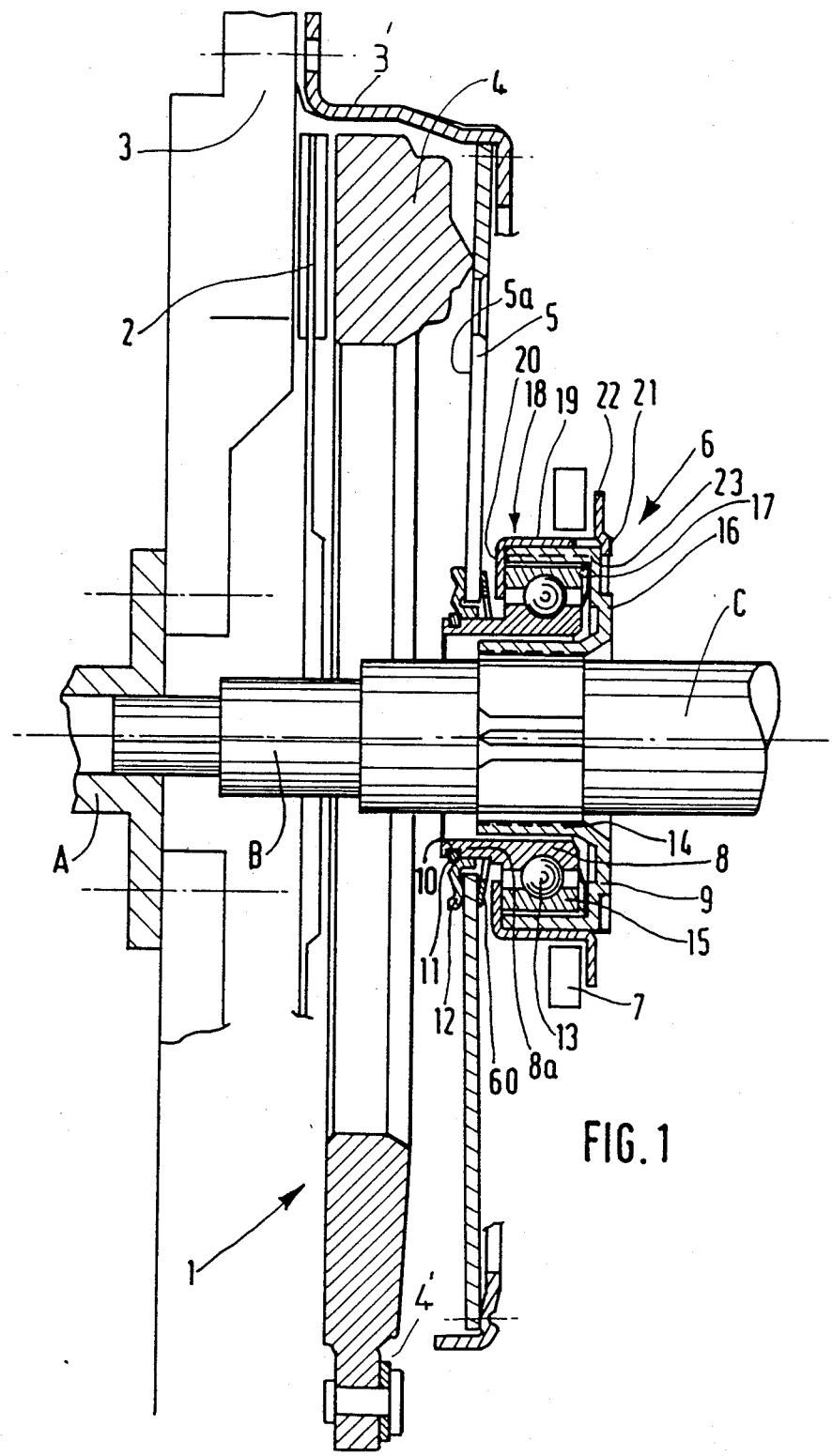
FIG. 1 is a view in axial cross section of a clutch control device of the "pull" type according to the invention, shown assembled in position in relation to the actuating means of a clutch.

Reference will first be made in particular to FIG. 1, in which a clutch assembly 1 is shown disposed between the end A of the crankshaft of an internal combustion engine and the input shaft B of a gearbox which is to be coupled in rotation with the engine through a friction disc 2. The friction disc 2 is mounted so as to be rotatable with the input shaft B of the gearbox, and is arranged to be brought into contact with a reaction plate 3 which is mounted so as to be rotatable with the engine. The contact between the friction disc 2 and reaction plate 3 is obtained through the pressure exerted by a pressure plate 4, which is biassed axially by means of a resilient actuating member 5, in this example a diaphragm. The diaphragm is itself actuated in its central region, which is in the form of a plurality of radial fingers, by means of a clutch control device 6, which is movable along a cylindrical journal C, coaxial with the shaft B, under the influence of a control member 7 which in this example comprises a clutch operating fork.

It will be noted that the ends of the radial fingers of the diaphragm 5 constitute the actuating means of the clutch, and also that the said diaphragm bears at its outer periphery on a cover plate 3'. It will also be noted that the radially outermost part of the diaphragm 5 constitutes a Belleville ring, the inner periphery of which bears on the pressure plate 4. The pressure plate 4 is coupled with the cover plate 3' for rotation therewith, but with a facility for axial displacement which is effected by means of tangential tongues 4'. The cover plate 3' is carried on the reaction plate 3 by means of screws (not shown), extending through a radial flange which is provided on the outer periphery of the cover plate. When the clutch is engaged, the disc 2 is gripped between the plates 3 and 4.

The clutch control device 6 includes a working element 8 by which it acts on the fingers of the diaphragm 5, and a manoeuvring member 9 whereby it is adapted to be displaced by means of the control member 7.

Figure 2:
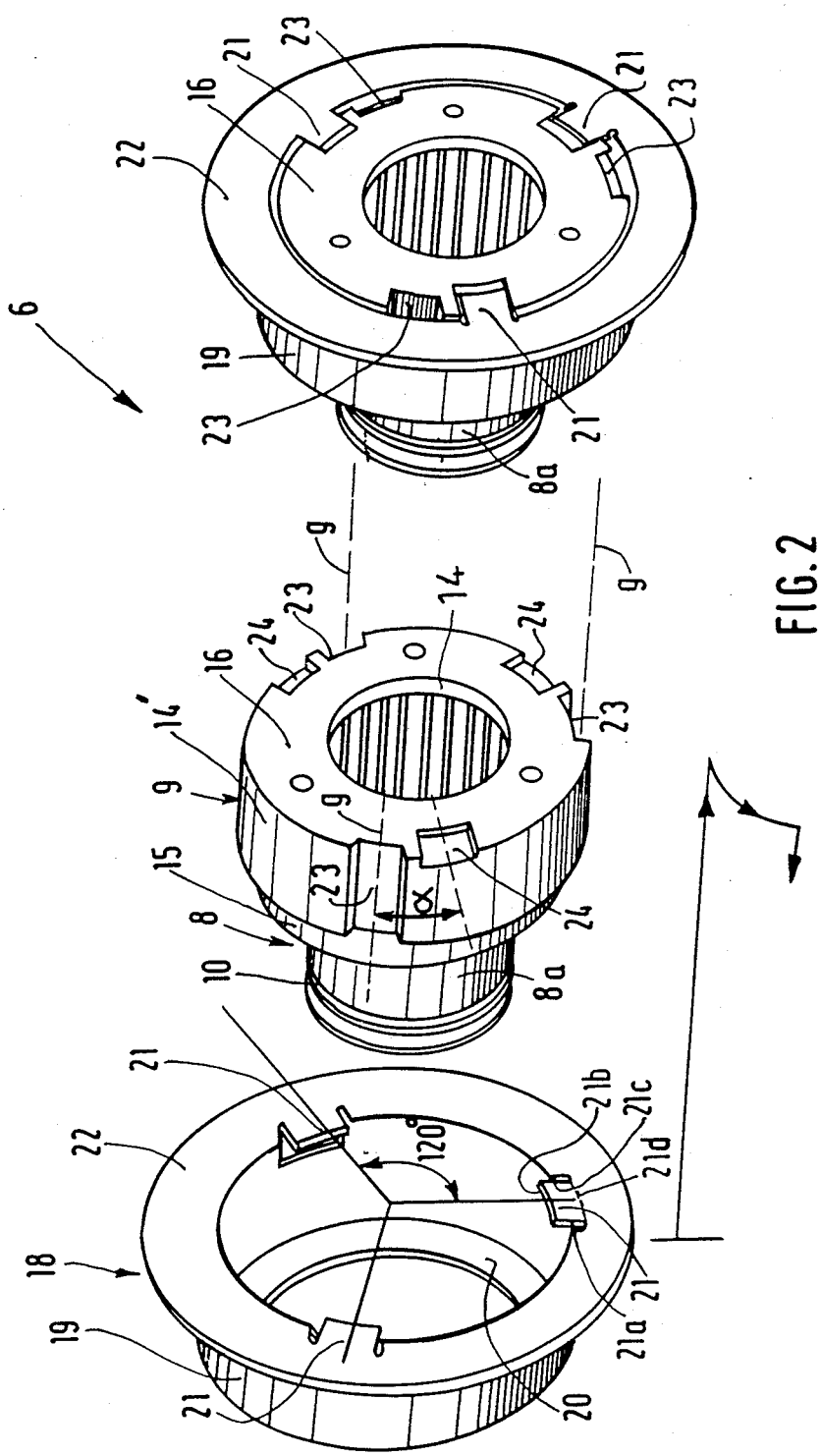
FIG. 2 is an exploded perspective view of a clutch control device according to FIG. 1.

In FIGS. 1 and 2, the clutch control device 6 is arranged so as to act in a tractive mode, for the purpose of disengaging the clutch and freeing the disc 2. To this end, the working element 8, which takes the form of a ball bearing having balls 13, is provided with a rotatable inner ring, the free end portion 8a of which extends through the diaphragm 5. The end portion 8a is made sufficiently long to enable an annular groove 10 to be formed in it. A ring 11 is mounted in this groove to enable the sleeve portion 8a to engage, at least in the axial direction away from the clutch and towards the device 6, with a thrust ring 12 which is itself secured to the diaphragm 5. The thrust ring 12 is carried on the face 5a of the diaphragm which faces away from the clutch control device 6. A Belleville ring 60 is mounted so as to bear on the ring portion 8a and the diaphragm, so as to maintain the ring 12 constantly in engagement with the diaphragm.

The manoeuvring element 9 comprises an axial sleeve portion 14, by which the device 6 is adapted to be engaged and displaced by sliding on the cylindrical surface C. To transmit axial thrust to and from the outer bearing ring 15 of the bearing 8, the element 9 includes a radial ring portion 16 extending transversely and fixed with respect to the sleeve portion 14. In this example, the radial portion 16 and the sleeve portion 14 are formed integrally with each other by moulding in plastics material, with the portion 16 having a zone of increased thickness at its outer periphery, on which an axially acting resilient member 17 bears in a manner to be described below.

In FIGS. 1 and 2, the transverse radial portion 16 of the manoeuvring member 9 is disposed at the end of the sleeve portion 14 remote from the thrust ring 12, and is provided at its outer periphery with a flange portion 14', FIG. 2, which is generally annular and orientated axially, so that the manoeuvring member 9 is generally of U-shaped cross section.

Besides automatic centring of the control device, the axial thrust of the bearing ring 15 is transmitted through the resilient member 17, which in this example is in the form of a corrugated washer.

In order to maintain the sub-assembly which includes the working element 8, the latter is axially secured to the manoeuvring member 9 by means of a retaining shroud 18. In this example, the retaining shroud 18 is made of metal, and is rigid, comprising an annular lateral wall 19 which extends axially, with a radial flange 20 defining a shoulder directed towards the interior of the shroud. The outer bearing ring 15 bears against this shoulder so as to retain the ring 15 axially at the end nearest to the diaphragm 5. The resilient member 17 and the outer bearing ring 15 are thus confined axially between the radial portion 16 of the manoeuvring member 9 and the shoulder or flange 20 of the shroud 18.

The sub-assembly thus constituted is assembled on to the opposed portion of the control device by assembly means connecting the retaining shroud 18, via its annular wall 19, to the radial portion 16. In accordance with the invention, these assembly means comprise a plurality of lugs or tabs 21 projecting from the lateral wall of the shroud 18, and extending towards the interior of the shroud wall 19. In the present example there are three of these lugs 21, spaced apart at equal intervals circumferentially. They are generally rectangular in shape and are obtained by cutting and stamping on three sides 21a, 21b and 21c with subsequent outward bending about a line corresponding to the imaginary fourth side 21d of the rectangle defining the lugs 21. This bending operation is performed through an angle which is substantially perpendicular, such that the lugs 21 become directed radially towards the longitudinal axis of the retaining shroud 18, then towards the interior of the latter close to its free end that is remote from the radial flange 20. The lugs 21 form between them an angle of 120°.

In a preferred embodiment of the invention, the bending line of the lugs 21 passes through the imaginary side 21d of the rectangle and is situated in the plane of a flange portion 22. The flange portion 22 comprises a peripheral ring portion of the shroud 18 (or cover), lying in a plane perpendicular to the axis of the latter. In addition, it will be noted that the control fork 7 acts directly on the flange portion 22.

The manoeuvring member 9 is provided with axial recesses 23 in the form of grooves, extending through its radial portion 16, and such that the lugs 21 can be received in the grooves 23. The radial portion 16 is also formed with a set of recesses 24, open in the radial direction and terminating radially at the outer periphery of the radial portion 16. Each recess 24 corresponds to a respective one of the lugs 21 with which it cooperates, and is offset circumferentially with respect to the associated groove 23.

The arrangement described above enables the assembly of the retaining shroud 18 with the manoeuvring member 9 to be carried out by introducing the lugs 21 into the axial grooves 23, along which they are moved until they overlie the radial face of the radial portion 16. By rotation, the lugs 21 are then engaged with the respective recesses 24, the resilient member 17 being compressed during this assembly operation.

In this example, the lugs 21, in the form of radial tabs, are adapted to slide during the assembly operation in the three axial grooves 23. The cross section of the latter is substantially the same as the cross section of the lugs 21. The latter are formed on generatrices g of the annular flange portion 14' of the manoeuvring member 9 over the whole length of the flange portion 14', so that the tabs 21 finally part company with the grooves at the radial portion 16 in a direction opposite to its direction of engagement.

In the present example, the grooves 23 extend only part way through the thickness of the flange portion 14'. However, according to the requirements of particular applications, if the tabs 21 are made longer, the whole of the thickness of the annular flange portion 14' may be used, in which case the grooves 23 will consist of openings through the portion 14'.

The number of recesses 24 formed in the radial portion 16 is three. They are formed during a single moulding operation on its outer face (i.e. the face which is directed away from the outer bearing ring 15 and the flange 20). The blind recesses 24 are open radially, and are offset circumferentially from each other by an angle α with respect to the three grooves 23. The recesses 24, together with the similarly shaped lugs 21 which are located and held stationary therein, provide a bayonet type connection, which is completed simply by appropriate rotation of the retaining shroud 18 with respect to the manoeuvring member 9. The recesses 24 are thus radially oriented and of rectangular shape, being, as mentioned above, open at the outer periphery of the radial portion 16, with a band of material existing between the grooves 23 and the recesses 24.

In the present example, the operation of bringing the working element 8 into its automatically centred position within the retaining shroud 18, and maintaining it in that position, is obtained resiliently by means of the force exerted by the resilient ring 17. The latter is disposed exactly between the inner face of the radial portion 16 and the bearing 8, being in rigid engagement against the flange 20.

The inner face of the annular flange portion 14' limits the radial displacement of the ball bearing 8, which is mounted with a radial clearance with respect to the said annular flange portion 14', in order to allow the manoeuvring member 9 to be radially displaced against the action of the force exerted by the ring 17. A clutch control device is thus obtained in which auto centring is maintained, in the manner which is for example described in U.S. Pat. No. 4,144,957.

Since the ring 17 is compressed during assembly of the retaining shroud 18 with the manoeuvring member 9, it causes centring to be maintained automatically, and also ensures that the lugs 21 are retained in position in their corresponding recesses 24. It will be noted that the side edges of the recesses 24 prevent any rotation of the shroud 18, while the base of each recess 24 offers a relatively large engagement surface for the tabs. It will also be appreciated that the recesses 24 are formed in the thicker zone of the radial portion 16 at its outer periphery. Thus, not only does the ring 17 transmit thrusts to this stronger zone, but also the radial portion 16 is not unduly weakened by the presence of the recesses.

In operation of the clutch control device to disengage the clutch, the control fork 7 acts on the flange portion 22 so as to move it towards the right as seen in FIG. 1. The effect of this is to exert a pulling force on the free ends of the fingers of the diaphragm 5, thus eliminating the clamping force exerted by the diaphragm 5 on the pressure plate 4 and so freeing the friction disc 2.

The clutch control device 6 can of course be of the type in which automatic centring is not maintained, and in this case the outer ring 15 of the bearing is mounted without any clearance with respect to the annular flange portion 14'. A radial clearance does exist in all cases between the sleeve portion 14 and the rotating inner ring 13 of the bearing.

Figure 3:
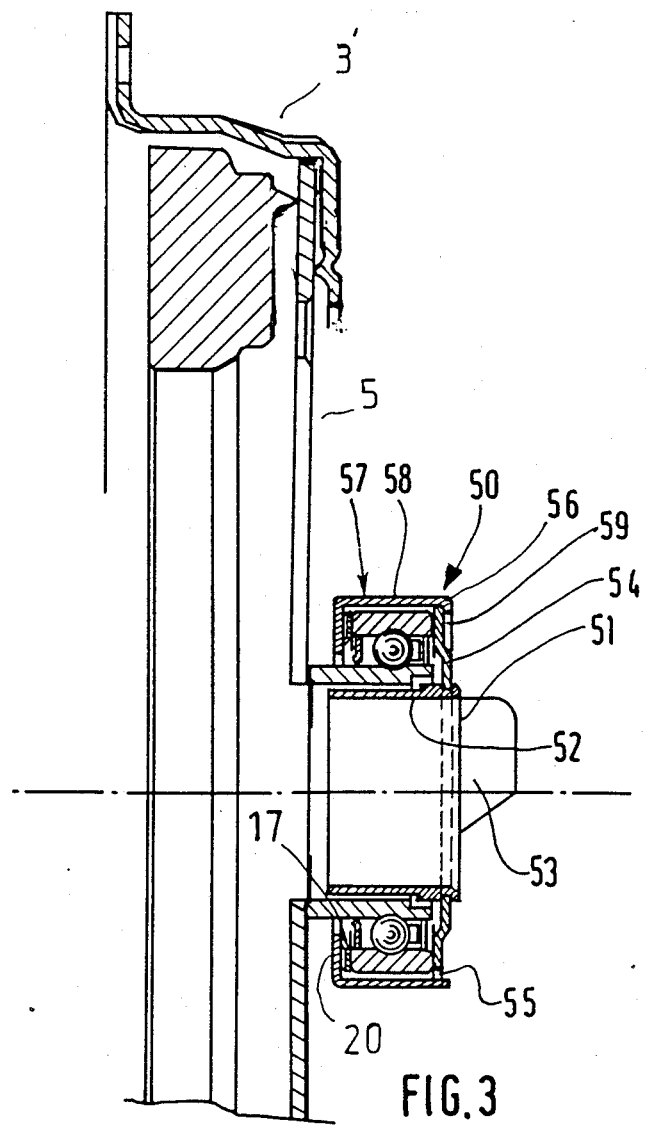
FIG. 3 is a view in axial cross section of a clutch control device of the "push" type, in a further embodiment of the invention, it too being shown assembled in place in relation to the actuating means, shown in part, of the clutch.

Turning now to the other embodiment which is shown in FIG. 3, the clutch control device, here indicated by the reference numeral 50, is adapted to exert a pushing force on the clutch actuating means of the clutch (i.e. the free ends of the fingers of the diaphragm 5) in order to free the friction disc 2. The device 50 differs essentially from the device 6 described with reference to FIGS. 1 and 2, in that (except for the principle, known per se, of using the clutch control device to act in a "pushing" mode on the diaphragm) the manoeuvring member, 51, of the device 50 includes a sleeve portion 52 which is provided with guide tabs 53, for engagement by the control member (not shown). The latter here acts in a pushing mode on the outer face of the transverse radial portion, 54. In this example, the transverse radial portion 54 is preferably of metal, and is fixed with respect to the sleeve portion 52, the latter also being of metal. The elements 52 and 54 are secured together in a gripping relationship. The radial portion 54 has slots formed at its periphery, these slots being arranged to allow a set of tabs 56 of the retaining shroud, 57, to pass through them during the assembly operation. The tabs 56 are of a section corresponding to that of the slots 55, and are formed by the bending of portions provided for this purpose, in a direction perpendicular to the annular lateral wall 58 of the retaining shroud 57. Locking is then effected in the same way as is described above, by rotation of the shroud 57 (or cover) with respect to the radial portion 54 of the sleeve portion 52, until the tabs 56 of the retaining shroud 57 become engaged in recesses 59. The recesses 59 are offset circumferentially, and in this example are formed by the hollowing out of portions of the radial portion 54, defining a radially open hollow element in each case. Thus, in this example, the recesses 59 are open radially at the outer periphery of the radial portion 54, while the slots 55 constitute the axial groove means corresponding to the grooves 23 in FIG. 2. The radial portion 54 does not in this case have an axial flange at its outer periphery.

As can be seen from FIG. 3, the recesses 59 constitute zones of engagement which are axially offset for engagement with the outer ring of the ball bearing, the resilient ring 17 being interposed between the shoulder 20 of the retaining shroud 57 and the outer ring of the ball bearing. These zones of engagement are made rigid, to great advantage, by the application of the invention with the use of stamping during manufacture.

The radial portion 54 may of course also be formed of the same material as the sleeve portion 52. It will be noted that in all cases, the retaining shroud 18 or 57 overlies the radial portion 16 or 54; and that the axial distance between the shoulder of the retaining shroud and the tabs 21 or 56 is quite large, being such that the force exerted by the resilient member 17 can be precisely determined. In addition, the dimensions of the recesses 59 and 24 is preferably calculated in such a way that the tabs 21 or 56 will not project with respect to the appropriate face of the radial portion 16 or 54.

In all embodiments, the resilient member 17 may of course comprise a Belleville ring or the like. The control member 7 may take the form of the piston of a hydraulic control actuator. Finally, the tab 21 or 56 may be slightly inclined towards the radial portion 16 or 54, in which case the arrangement shown in FIG. 11 of U.S. Pat. No. 4,529,075 (in which the width of the tabs is smaller than that of the openings in the retaining shroud in which they engage) is applicable. The number of tabs may vary according to the application, and may be greater than three.

What is claimed is:

1. A clutch control device, for example for an automotive vehicle, of the kind comprising a working element, a manoeuvring member, a retaining shroud, and assembly means, the working element having clutch engaging means whereby the clutch control device is adapted to act on a clutch actuating means of a clutch and further having a transverse radial portion, the manoeuvring member having control member engaging means whereby the manoeuvring member is adapted to be displaced by a control member engaged therewith, the retaining shroud being disposed between the working element and the manoeuvring member and joining them together axially, the said shroud comprising an annular lateral wall defining a shoulder, the working element being in engagement with said shoulder, the said assembly means comprising a plurality of tabs projecting from the said lateral wall of the retaining shroud and extending towards the interior of the said lateral wall, the assembly means further comprising an axially acting resilient member disposed between, and in engagement with, the working element and the manoeuvring member and being axially confined thereby so as to be deformable during assembly of the retaining shroud with the manoeuvring member, and the assembly means further comprising a portion of the working element between the said radial portion of the manoeuvring member and the said shoulder of the retaining shroud, wherein the manoeuvring member has axially extending groove means, interrupting its said radial portion, for receiving the said tabs, the said radial portion having a plurality of recesses formed on one of its faces and disposed for cooperation of each said recess with a respective one of the said tabs, each said recess being open in the radial direction at the outer periphery of the said radial portion, and each said recess being circumferentially offset with respect to its associated said groove means, in such a way that the operation of assembling the retaining shroud with the manoeuvring member may be carried out by introducing the said tabs into the axial groove means until the tabs leave the latter at the appropriate face of the radial portion, and so that upon subsequent rotation causes the said tabs to engage with the said recesses, while the said resilient member is compressed during the said assembly operation.

2. A clutch control device according to claim 1, wherein the said tabs extend radially, the said recesses being substantially identical in profile with the said tabs.

3. A clutch control device according to claim 2, wherein the said tabs form radial lugs of rectangular shape, obtained by cutting three sides and by bending about a line corresponding to an imaginary fourth side of the rectangle and through an angle which is substantially perpendicular.

4. A clutch control device according to claim 3, wherein the retaining shroud comprises a radially extending flange portion extending peripherally therefrom, the said line about which each said tab is bent being situated in the plane of the said flange portion.

5. A clutch control device according to claim 4, wherein the manoeuvring member is of moulded plastics material, the said radial portion of the manoeuvring member having at its outer periphery an annular, axially extending flange portion, the said groove means being formed in the said axial flange portion and the said recesses comprising blind recesses formed in moulding the manoeuvring member.

6. A clutch control device according to claim 4, wherein the said radial portion of the manoeuvring member is of metal, the said axial groove means being in the form of slots formed in the outer periphery of the said radial portion, and the said recesses being formed by stamping.

* * * * *